United States Patent
Verdoes et al.

(10) Patent No.: US 6,224,648 B1
(45) Date of Patent: May 1, 2001

(54) METHOD AND DEVICE FOR SEPARATING METALS AND/OR METAL ALLOYS OF DIFFERENT MELTING POINTS

(75) Inventors: Dirk Verdoes; Hendrik Visscher, both of Apeldoorn (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 09/319,963

(22) PCT Filed: Dec. 9, 1997

(86) PCT No.: PCT/NL97/00678

§ 371 Date: Jun. 14, 1999

§ 102(e) Date: Jun. 14, 1999

(87) PCT Pub. No.: WO98/27240

PCT Pub. Date: Jun. 25, 1998

(30) Foreign Application Priority Data

Dec. 18, 1996 (NL) .................................................. 1004824

(51) Int. Cl.[7] ...................................................... C22B 9/02
(52) U.S. Cl. ............................. 75/407; 266/88; 266/228; 266/233; 266/236
(58) Field of Search ............................. 75/407; 266/227, 266/228, 236, 88, 900, 233

(56) References Cited

U.S. PATENT DOCUMENTS

| | | | |
|---|---|---|---|
| 334,208 | * 1/1886 | Wetherill | 75/407 |
| 1,910,920 | * 5/1933 | Higgins | 75/407 |
| 4,042,228 | 8/1977 | Ward et al. | 266/215 |
| 4,043,802 | 8/1977 | Esdaile et al. | 75/663 |
| 4,511,398 | 4/1985 | Kugler | 75/587 |

FOREIGN PATENT DOCUMENTS

| | | |
|---|---|---|
| 168 784 | 7/1934 | (CH) . |
| 1 758 953 | 3/1971 | (DE) . |
| 004174 | * 3/1973 | (EP) . |
| 0 757 013 | 2/1997 | (EP) . |

OTHER PUBLICATIONS

By Albert E. Melin, "Metallraffination dur fraktionierte Kristallisation aus der Schmelze", *Erzmetall*, vol. 41, No. 10, Oct. 1988, pp. 522–525.

* cited by examiner

*Primary Examiner*—Roy King
*Assistant Examiner*—Tima McGuthry-Banks
(74) *Attorney, Agent, or Firm*—Young & Thompson

(57) ABSTRACT

In order to separate metals and/or metal alloys of different melting points from one another, a mixture of these metals and/or metal alloys is brought to a temperature at which the metal or the metal alloy of relatively low melting point is molten and the metal or the metal alloy of relatively high melting point is in the solid state. The solid constituents are separated from the melt, use being made of washing column with at least one filter which withstands the temperature of molten metal. Each of the filters is arranged in the wall of a separate pipe which extends through the washing column. The mixture is fed to one end of the washing column and moves along the pipe or pipes, towards means arranged at the opposite side of the washing column for removing solid crystalline material. The melt passes via the filter or filters into the pipe or pipes, and flows in countercurrent to the mixture situated on the outside of the pipe or pipes, towards a melt discharge. A suspension zone situated in an upper part of the washing column changes into a packed bed of crystals. At the bottom of the washing column, the crystals are washed in countercurrent with their own recirculated melt.

10 Claims, 2 Drawing Sheets

METHOD AND DEVICE FOR SEPARATING METALS AND/OR METAL ALLOYS OF DIFFERENT MELTING POINTS

BACKGROUND OF THE INVENTION

This application is a National Stage application that claims the priority of PCT/NL97/00678 filed Dec. 9, 1997 and Netherlands application No. 1004824 filed Dec. 18, 1996.

The invention relates to a method for separating metals and/or metal alloys of different melting points, a mixture of the said metals and/or metal alloys being brought to a temperature at which the metal or the metal alloy of relatively low melting point is molten and the metal or the metal alloy of relatively high melting point is in the solid state, and finally separating the solid constituents from the melt.

The suspension of solid constituents in a melt can be made, on the one hand, by heating a solid substance so that only the low-melting components melt and, on the other hand, by cooling a melt so that a fraction of the melt crystallizes out.

In practice, aluminium is produced using an electrolysis process which uses considerable amounts of energy. Also known is a process as indicated in the introduction in which metals, including aluminium, are refined by fractional crystallization from the melt (cf. journal "Metall" No. 7-8/95, pp. 491–495). In this process, the crystals and the melt are separated inefficiently, for example by pressing the crystals downwards using a compression means to form a compact mass.

SUMMARY OF THE INVENTION

The object of the invention is to be able to separate melt and solid (unmelted or crystallized) pieces which, depending on the process and the phase diagrams, may be the product stream or the residual stream of the process, extremely efficiently and with a relatively low power consumption.

According to the invention, a washing column having one or more filters which can withstand the temperature of molten metal is used to separate off the solid constituents, each of these filters being arranged in the wall of a separate pipe which extends through the washing column, the mixture being fed to one end of the washing column and moves along the pipe or pipes towards means arranged at the opposite side of the washing column for removing solid crystalline material, the melt passing via the filter or filters into the pipes and flowing, in countercurrent to the mixture situated on the outside of the pipe or pipes, towards a melt discharge, and some of the crystalline material removed being melted and then being conveyed to the bed of crystals as washing liquid, in order to wash the said bed of crystals with its own melt, in counter current.

The method according to the invention is particularly suitable for refining aluminium, for example separating low-alloy aluminium (wrought alloys) and high-alloy aluminium (cast alloy). However, the method may also be used for refining other metals, such as copper, lead, tin and zinc.

It should be noted that Swiss patent 168,784 has disclosed a method for purifying light metals or their alloys. In a vat there is situated a melt, the temperature of which is set in such a manner that the impurities have solidified and the pure metal is discharged in the liquid state through a filter situated in the vat. There is no mention of a washing column, nor of the melt which is discharged via the filter and the mixture situated on the outside of the filter being in countercurrent. Furthermore, this publication does not disclose that part of the removed crystalline material is melted and then fed to a bed of crystals as washing liquid, in order to wash the bed of crystals with its own melt, in countercurrent.

Furthermore, U.S. Pat. No. 4,043,802 has disclosed a method for the continuous purification of impure metals. In this method, a mixture of metal crystals and liquid is situated in a column which has a relatively cool zone and a relatively warm zone. There is a continuous temperature gradient between these zones. The temperature of the cool zone is set in such a manner that there can be both liquid and crystalline metal. The temperature of the warm zone is sufficiently high to melt the crystals. Part of the column in the said cool zone is cooled by the formation of a coherent mass of metal crystals. Incipient melting is then brought about, in order to release crystals in the mass, from the mass in the crystal column, to the liquid metal in the cool zone of the column. The crystals are then conveyed, via the temperature gradient, into the warm zone, where the crystals are melted and the warm zone is enriched with the pure, liquid metal. Here again, there is no mention of a washing column in which filters are arranged in the wall of a separate pipe which extends through the washing column, the mixture is fed to one end of the washing column and moves along the pipe or pipes towards means arranged at the opposite side of the washing column for removing solid crystalline material. Furthermore, this American patent does not disclose that the melt passes via filters into a pipe or pipes and flows, in countercurrent to the mixture situated on the outside of the pipe or pipes, towards a melt discharge. Another new feature compared to this American patent is that part of the removed crystalline material is melted and then fed as washing liquid to the bed of crystals, in order to wash the bed of crystals with its own melt, in countercurrent.

U.S. Pat. No. 4,511,398 describes a method for purifying aluminium which is contaminated with metals, using sodium. In this case, use is made of a separating column, and the temperature range lies between the melting point of the aluminium or the aluminium alloy and the boiling point of sodium. The preheated sodium is introduced into the separating column from a circuit provided with a heat exchanger, means for precipitating solid particles, a pump and a storage tank, in quantities at least five times greater than the mass of the contaminated metal. The sodium flows in countercurrent to the contaminated aluminium, which is likewise introduced into the separating column. The purified aluminium, which contains a small residual quantity of contaminated metal and a sodium content of not more than 500 ppm, is removed from the separating column. Sodium with a low concentration of contaminated metal is returned to the circuit.

Preferably, the crystalline material is removed by a scraping knife.

In order to wash solid particles and to prevent the contaminants from reaching the stream of melt, some of the stream of melt is returned to the column as washing liquid.

This can be achieved by using a valve, which controls the discharge of melt (maybe the product), to regulate the pressure in such a manner that a portion of the melt penetrates into the bed of crystals and washes the said bed in countercurrent. If the flow rate of washing liquid is set correctly, the washing liquid will crystallize out before reaching the filters. On the one hand, this means that there is no loss of washing liquid and, on the other hand, the filters are prevented from freezing up. The level at which the washing liquid crystallizes—the so-called washing front— can be established on the basis of the sharp change in temperature above and below the washing front.

The pipes, each with their own filter, are arranged uniformly over the cross-section of the cylindrical washing column.

It may be advantageous to generate a pulsating stream of liquid in the discharge of the pipe or pipes. This makes it possible, in particular, to reduce the friction along the wall at the level of the filters.

The device which is suitable for carrying out the method comprises, according to the invention, a melting or crystallization vat with temperature-regulating means for keeping the temperature of high-melting and low-melting metals or alloys situated in the said vat at a value between the melting or crystallization temperature of the said high-melting and low-melting metals or alloys, a washing column with one or more pipes, which extend therein, are closed at one end and in part of the wall of which a filter is arranged, forming the only direct connection for the melt between the space outside the pipes and the space inside the pipes, means for guiding a mixture of melt and crystals from the said melting vat to one end of the washing column, means for removing crystalline material at the opposite end of the washing column, means for discharging melt from the pipe or pipes and means for washing solid particles in countercurrent using their own melt.

The filters preferably consist of porous ceramic material.

BRIEF DESCRIPTION OF THE DRAWINGS

The invention will now be explained with reference to the two diagrammatic figures and a number of examples.

In FIG. 1, the reference numerals have the following meaning:

Figure 1:
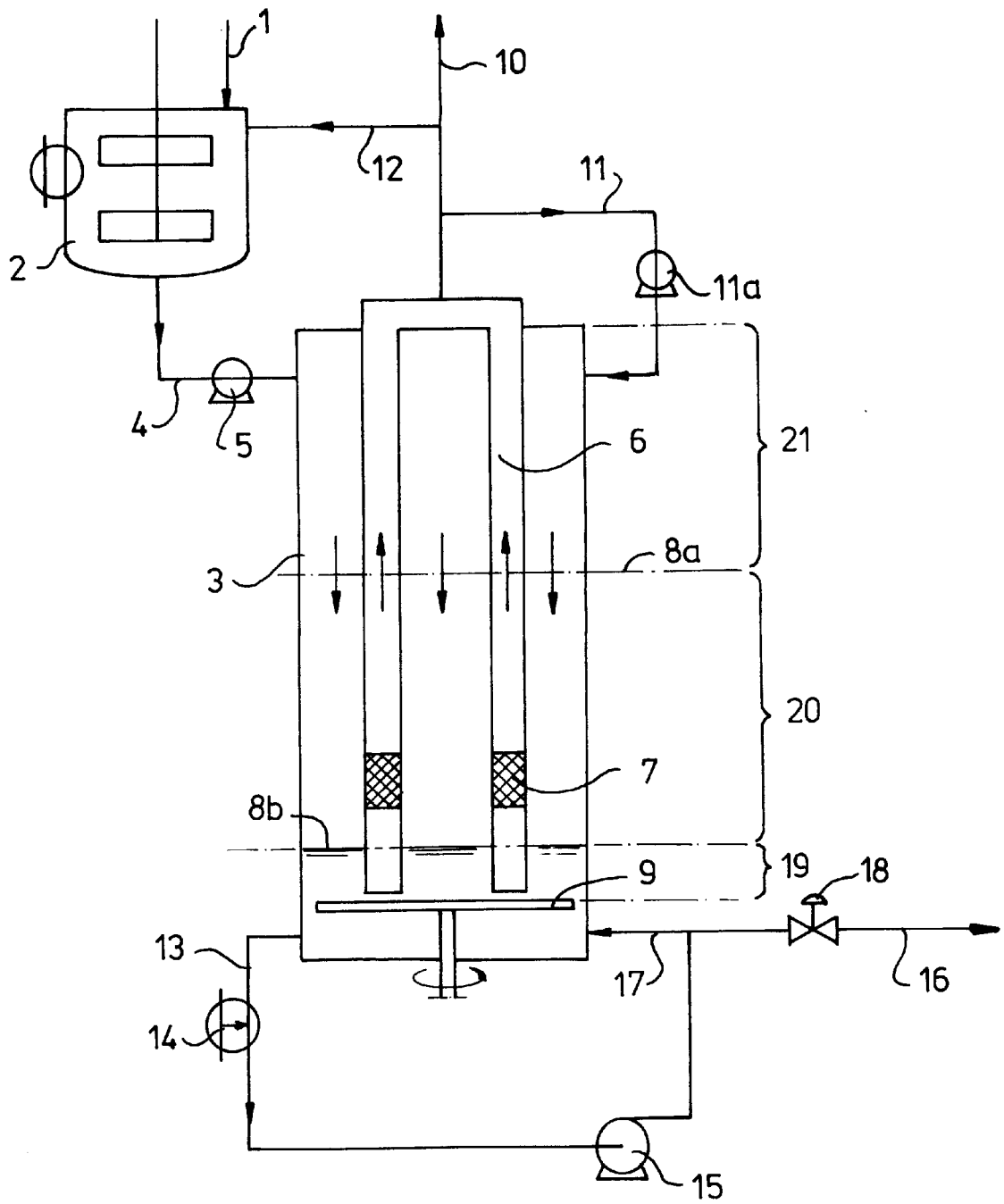
FIG. 1 is a schematic diagram of an embodiment of the device and method of the present invention.

1=feed for metal mixture to be treated,
2=melting or crystallizer vessel with control means for keeping the temperature, by supplying or removing calories, at a value which is between the melting temperature of the metal or the alloy of relatively high melting point and the melting temperature of the metal or the alloy of relatively low melting point,
3=washing column,
4=line for feeding mixture (suspension) of melt and solid pieces into the washing column 3,
5=pump in line 4,
6=pipes which are distributed essentially uniformly over the cross-section of the column 3,
7=filters for allowing through melt and holding back solid constituents,
8a=top of the bed of crystals,
8b=washing front
9=scraping knife
10=discharge line for filtrate from the pipes 6,
11=filtrate recirculation line of the washing column,
11a=pump in line 11,
12=filtrate recirculation line of the melting or crystallization vat,
13=discharge line for particles scraped off,
14=melter,
15=pump in discharge line 13,
16=discharge for molten particles scraped off,
17=washing liquid line,
18=control valve,
19=washing zone,
20=concentration/thickening zone,
21=suspension zone.

DESCRIPTION OF THE PREFERRED EMBODIMENTS

The suspension coming out of the vat 2 is fed into the washing column 3. On the outside of the pipes 6, this suspension flows downwards in the so-called suspension zone 21. The latter zone 21, at the level 8a, changes into the concentration/thickening zone 20. Beneath this is situated a packed bed of crystals containing, for example, 50 to 70% by volume of crystals. Via the filters 7, melt flows into the pipes 6, the abovementioned packed bed of solid particles being formed in the concentration/thickening zone 20. With the aid of the scraping knife 9, solid material is scraped off. The solid particles thus formed are fed via the line 13 into the melter 14, with the aid of a recirculating stream of melt which will be explained in more detail. The majority of the melt is discharged, by means of the pump 15, via the valve 18 and the line 16. A small proportion is recycled, via the line 17, to the bottom of the column 3. This recirculation stream serves to wash the crystalline particles in the washing zone 19, thus preventing undesired constituents of the melt from seeping through to the bottom of the column 3. The liquid in the washing zone is pure melt. By adjusting the control valve 18, the washing pressure can be set such that the stream fed via the line 17 washes the bed of crystals in the washing zone in countercurrent. In fact, in the washing column 3 there is a downwards flow of suspension (S+L) on the outside of the pipes 6, an upwards flow in the pipes 6 of melt (L), which has passed into the pipes 6 via the filters 7, and the said recirculating washing stream of pure melt, which is admitted to the washing zone via the line 17.

As can be seen from the following examples, the diagrammatically depicted device can be employed in various ways.

EXAMPLE 1

A solid mixture of essentially pure pieces of aluminium and pieces of aluminium alloys (for example AlSi) or other metals (for example Zn) which have a lower melting point than pure aluminium is fed via the feed 1 into the vat 2, which is designed as a melting vat. The pieces are preferably of a size between 100 and 1000 mm. Heat is supplied to the vat 2, so that the temperature is brought to a value between the relatively low melting point of the contaminating alloy and the relatively high melting point of the pure aluminium. The temperature is in any event lower than 660° C. A suspension of essentially pure solid aluminium pieces in an impure melt is formed. This suspension is fed into the top end of the washing column 3, via the line 4, by means of the pump 5. The contaminating melt flows via the filters 7 into the pipes 6, and the pure solid pieces accumulate in a packed bed beginning above the filters and ending at the bottom of the washing column 3, at the scraping knife 9. The scraping knife 9 scrapes off the solid mass, and the particles formed in this way are guided via the line 13, with the aid of a recirculating stream of melt, to the melter 14. The particles are melted and the resulting melt is recirculated by means of pump 15. Most of the melt is discharged via the line 16 as product. A small proportion of the melt is guided, via the line 17, into the column 3 as washing liquid, in order to wash the aluminium-rich particles in the bottom of the column in countercurrent, thus preventing contaminants from seeping through to the stream of product at the bottom of the column. The introduction of the washing liquid at the bottom of the bed is controlled via the washing pressure, which can be adjusted using control valve 18. The hot washing liquid crystallizes out on the particles in the bed, since these particles are colder. The flow rate of washing liquid is set, using the washing pressure and the control valve, so that the crystallization of the washing liquid takes place before the washing liquid reaches the filters, so that there is no loss of washing liquid.

A filtrate of molten contaminants flows upwards, via the pipes 6, towards the discharge line 10.

The control valve 18 is set so that excess pressure prevails in the flushing chamber beneath the scraping knife (for example 2 bar). Pure solid particles and pure melt (washing liquid) are situated beneath the washing front, which is indicated by the dot-dashed line 8b. The washing pressure (2 bar) in the bottom of the column forces the pure melt upwards as far as the level 8b. At the washing front, the washing liquid, which is supplied as pure melt, crystallizes on the cold solid particles. There is also pressure on the feed side of the bed. This pressure is linked to the flow of the melt through the packed bed of particles.

The pressure difference in the column ensures the upwards flow of the contaminated filtrate into the pipes 6.

Some of the stream of filtrate can be branched off, via a pump 11a in the line 11, in order to be returned to the top zone of the washing column 3, where it builds up a certain degree of (extra) pressure. Furthermore, a relatively great recirculation stream is tapped off from the stream of filtrate, via the line 12, and fed to the melting vat 2, in order there to ensure a workable solids percentage of between 15 and 50%. The remaining stream of filtrate can be discharged as residue for further processing or as waste.

By way of example, a total of about 10% of the solid material is remelted.

In general, pieces which are larger than 1000 mm cannot be used in the washing column, or can be used only with difficulty. In that case, the melt can be drained in a simple manner via a coarse screen or a filter.

EXAMPLE 2

In contrast to Example 1, the material to be processed consists of a mixture of pieces in which the contamination is formed by an alloy or metal of a higher melting point than the pure aluminium. By way of example, the contamination consists of an AlFe alloy or of crushed steel screws. Here too, the size of the pieces is preferably between 100 and 1000 mm.

The temperature in the melting vat 2 is higher than 660° C. (the melting point of pure aluminium) and lower than the melting point of the contaminant. The result is a suspension of impure low-aluminium solid pieces and a pure aluminium-rich melt. The low-aluminium residue is scraped off using the knife 9 and is melted in the melter 14. Most of this is discharged as residue via the line 16, while a small proportion is guided back into the bottom of the column 3 as washing liquid, via the line 17, to prevent aluminium-rich melt from seeping through to the stream of residue. The aluminium-rich product stream leaves the column 3 via the porous filters 7 and the pipes 6. Some of this stream can be guided back into the top of the column 3 via a pump in the line 11. There is no recycling via the line 12.

It is estimated that 80–95% of the solid material is melted in the melting vat.

EXAMPLE 3

Via feed 1, the crystallizer 2 is fed with a stream which contains both the aluminium and the contaminants in the molten state. This material is cooled in the crystallizer so that fractional crystallization takes place: aluminium-rich crystals are formed, while the contaminants remain in the melt. The operation of the washing column in order to separate the relatively pure crystals from relatively impure melt corresponds to that which is described under Example 1. The aluminium-rich product is scraped off as solid material by the knife 9 and, after melting, leaves the column via line 16, while the residue is removed via the filters 7 and the pipes 6. Some of the filtrate (impure melt) is recycled to the crystallizer 2, in order to ensure that the percentage by mass of crystals (10–50%) in the crystallizer leads to an effective situation, and the percentage of contaminants in the melt can be adjusted, thus increasing the yield of the process. The melt obtained from the aluminium crystals is very pure. A small proportion of this product melt is used as washing liquid.

EXAMPLE 4

An Fe-containing Al (obtained for example from the recycling of packaging) is fed as melt to the crystallizer 2. Manganese is admixed in order to reduce the solubility of iron in aluminium. Cooling results in fractional crystallization, the Fe-rich phase crystallizing out first. There is thus a suspension of Fe-rich crystals in an Al-Mn-rich melt. The separation takes place as described in Example 2. Since the washing column 3 is a closed apparatus which is coupled directly to the crystallizer 2, it is easy to control the temperature accurately.

By comparison with the method using a washing column, a known method which uses fractional crystallization to separate off Fe-rich contaminants, originating from packaging cans to be recycled, with the aid of a ceramic filter presents the following drawbacks:

1. incomplete separation is achieved between the solid material and the liquid, so that some of the aluminium-rich melt remains in the filter cake comprising contaminating particles, and
2. when working with an open filter, it is difficult to prevent localized cooling at the edge of the filter; as a result, the aluminium-rich melt also begins to crystallize out, thus impairing the action of the filter and reducing the yield of aluminium-rich product.

Figure 2:
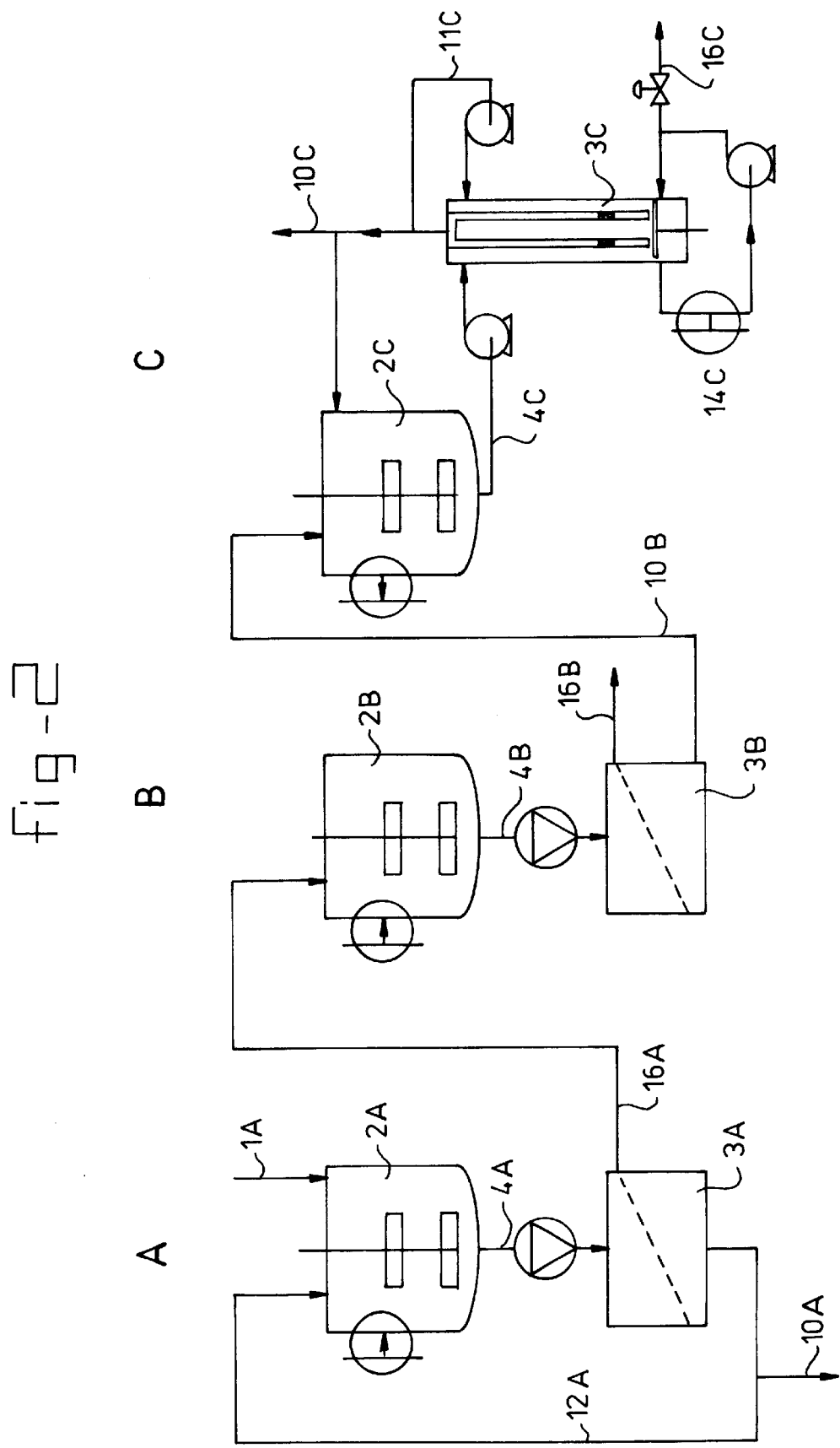
FIG. 2 is a schematic diagram of a further embodiment of the device and method of the present invention.

FIG. 2 shows a three-stage separating process for recycling aluminium. The three processors are successively denoted by A, B and C. In process A, analogously to Example 1, the low-melting contaminants are removed by means of selective melting at a temperature which is lower than 660° C. The product (the solid phase) from process A, after leaving the S-L separator or washing column 3A, is fed to the melter 2B (temperature greater than 660° C.) of process step B, in which stage, analogously to Example 2, the high-melting contaminants remaining as solid material are separated from the aluminium-rich melt. The residue from the S-L separator 3B of process step B is fed to the crystallizer 2C of process step C, where it is cooled (for example at a temperature lower than 660° C.). Fractional crystallization of aluminium forms very pure crystals, which are separated efficiently by washing column 3C from the contaminants which remain in the melt.

The use of the washing column described for refining aluminium and other metals is an important technical breakthrough in the recycling of metals. Advantages are: no problems with scaling up, no loss of washing liquid, high throughput of solid material per square meter of column area, accurate adaptability to the composition of the metal to be recycled.

It is important that the washing column 3 is able to lead to a virtually complete separation of solid material and melt, and the product may be both a solid material and a melt.

What is claimed is:

1. A method for separating metals and/or metal alloys of different melting points, the method comprising the steps of:

bringing a mixture of the said metals and on metal alloys to a temperature at which the metal or the metal alloy of relatively low melting point is molten and the metal or the metal alloy of relatively high melting point is in the solid state;

separating the solid constituents from the melt with a washing column having one or more filters that operate at the temperature of molten metal, each of these filters being arranged in the wall of a separate pipe which extends through the washing column;

feeding the mixture to one end of the washing column and moving the mixture along the pipes towards means arranged at the opposite side of the washing column for removing solid crystalline material;

passing the melt via the filters into the pipes so that the melt flows, in countercurrent to the mixture situated on the outside of the pipes, towards a melt discharge; and melting some of the crystalline material removed and feeding the melted crystalline material to the bed of crystals as washing liquid, in order to wash the bed of crystals with its own melt, in countercurrent.

2. The method according to claim 1, wherein the crystalline material is removed by a scraping knife.

3. The method according to claim 1, wherein a number of the pipes, each with one of the filters, are arranged distributed uniformly over the cross-section of the cylindrical washing column.

4. The method according to claim 1, wherein part of the melt discharged from the pipe or pipes is returned to the washing column as filtrate recirculation washing liquid.

5. The method according to claim 1, wherein a pulsating stream of liquid is generated in the discharge of the pipe.

6. Device for separating metals and/or metal alloys of different melting points, comprising:

a melting or crystallization vat (2) with temperature-regulating means for keeping the temperature of high-melting and low-melting metals or alloys situated in the said vat at a value between the melting or crystallization temperature of the high-melting and low-melting metals or alloys;

a washing column (3) with one or more pipes (6), which extend therein, are closed at one end and in part of the wall of which a filter (7) is arranged, forming the only direct connection for the melt between the space outside the pipes and the space inside the pipes;

means (4, 5) for guiding a mixture of melt and crystals from the melting vat to one end of the washing column;

means for removing crystalline material (9, 13) at the opposite end of the washing column;

means (10) for discharging melt from the pipe or pipes (6); and means for washing solid particles in countercurrent using their own melt.

7. The device according to claim 6, further comprising means (11) for guiding some of the melt discharged from the pipes back into the washing column as filtrate recirculation liquid.

8. The device according to claim 6, wherein the means for removing crystalline material comprise a scraping knife (9).

9. The device according to claim 6, wherein the filters (7) consist of porous ceramic material.

10. A multi-stage separating installation for metals and/or metal alloys, comprising a number of devices according to claim 6 placed in series.

* * * * *